United States Patent
Xia et al.

(10) Patent No.: US 8,606,754 B2
(45) Date of Patent: Dec. 10, 2013

(54) METHOD FOR DOUBLY BACKING UP FILES ASYNCHRONOUSLY

(75) Inventors: Jing Xia, Shanghai (CN); Xiaoping She, Shanghai (CN); Min Zhang, Shanghai (CN)

(73) Assignee: Alcatel Lucent, Paris (FR)

( * ) Notice: Subject to any disclaimer, the term of this patent is extended or adjusted under 35 U.S.C. 154(b) by 274 days.

(21) Appl. No.: 12/733,909

(22) PCT Filed: Oct. 31, 2007

(86) PCT No.: PCT/CN2007/003098
§ 371 (c)(1),
(2), (4) Date: Mar. 26, 2010

(87) PCT Pub. No.: WO2009/055965
PCT Pub. Date: May 7, 2009

(65) Prior Publication Data
US 2010/0228698 A1    Sep. 9, 2010

(51) Int. Cl.
*G06F 17/30* (2006.01)

(52) U.S. Cl.
USPC ........................................................... 707/652

(58) Field of Classification Search
USPC ........................................................... 707/652
See application file for complete search history.

(56) References Cited

U.S. PATENT DOCUMENTS

| | | | | |
|---|---|---|---|---|
| 5,974,114 A | * | 10/1999 | Blum et al. | 379/9 |
| 6,445,905 B1 | * | 9/2002 | Pentikainen | 455/8 |
| 2002/0114435 A1 | * | 8/2002 | Lawyer et al. | 379/114.14 |
| 2004/0008694 A1 | * | 1/2004 | Guo | 370/395.52 |
| 2005/0005195 A1 | * | 1/2005 | Suzuki | 714/13 |

OTHER PUBLICATIONS

ETSI, Digital cellular telecommunications system, 1997.*
Wikipedia, Software bug, Oct. 26, 2007, accessed May 6, 2013.*

* cited by examiner

*Primary Examiner* — William Spieler
(74) *Attorney, Agent, or Firm* — Carmen Patti Law Group, LLC

(57) ABSTRACT

The present invention proposes a method for doubly backing up files asynchronously, wherein at least two first network elements share a second network element, both of said first network elements include respectively an active file handling device and a standby file handling device, characterized in that, said active file handling device copies the files to the second network element, if said standby file handling device finds that said active file handling device misses the files, said standby file handling device copies backups of the files to said active file handling device, thus the files stored in said active file handling device and the files stored in said standby file handling device being synchronized.

13 Claims, 4 Drawing Sheets

-Prior Art-

METHOD FOR DOUBLY BACKING UP FILES ASYNCHRONOUSLY

FIELD OF THE INVENTION

The present invention relates to the field of communication, and more particularly to asynchronous double files backup.

BACKGROUND OF THE INVENTION

Call detail record (CDR) is a report that telephone exchanges generated, which contains detailed information about calls originating from, terminating at or passing through the exchange. CDRs are used mainly for billing purpose. A call detail record is a data record that contains information related to a telephone call, such as the origination and destination addresses of the call, the time when the call started and ended, the duration of the call, the time of day the call was made and any toll charges that were added through the network or charges for operator services, among other details of the call. CDR data fields are fully populated when the underlying call/transaction ends. The CDR is an asset in managing long distance telephone costs and aids in the planning for future telecommunications needs.

Most telephone PBX (public branch exchange) and PMS (property management systems) output CDR. Generally, these get created at the end of a call but on some phone systems the data is available during the call. This data is output from the phone system by a serial link known as the Station Message Detail Recording port (SMDR).

At present, some billing centers need to delete the original CDR file after transferred successfully from wireless call server (WCS). Thus, the normal active/standby equipment synchronization mechanism may meet problem. For example, the active equipment has file 1 and file 2, and transfers file 1 to a billing center; the billing center deletes the transferred file 1 to mark that file 1 is transferred successfully. Note that, file 1 still exists in the standby equipment. If the active/standby equipment uses the normal synchronization mechanism, then the standby equipment will think file 1 is missed in the active equipment and copy file 1 to the active equipment. The result is that the billing center will misunderstand file 1 is not transferred successfully. This conflict with billing center transfer mechanism (transfer and delete).

FIG. 1 show an existing solution for synchronous double backup with active/standby mechanism. As shown in FIG. 1, the active file handling device 1 copies the CDR file from file set A1 to B1, A1 being a backup of B1, and the standby file handling device 2 copies the CDR file from file set A2 to B2, A2 being a back up of B2. The billing center gets files from B1 or B2 and then deletes those files in B1 and B2 after transferred successfully. For synchronization between A1 and A2, if the standby file handling device 2 finds that the active file handling device 1 misses file, then it will copy the backup file to the active file handling device 1 in order to ensure file sets A1 and A2 are synchronized. For synchronization between B1 and B2, if the standby file handling device 2 finds that the active file handling device 1 misses file for a while (for example 30 minutes), then it will deletes the backup file B2 in order to ensure file sets B1 and B2 are synchronized.

It means the synchronization between A1&A2 and B1&B2 are different, it will make the system more complicate and consume more system resource.

Therefore, it is necessary to find a new method to fulfill the following two requirements:

ensure that the billing center may delete the original CDR file after transferred from the WCS successfully;
ensure that the WCS has the CDR file backup after transferred.

SUMMARY OF THE INVENTION

To solve the above problem in the prior art, according to an aspect of the present invention, a method for doubly backing up files asynchronously is proposed, wherein at least two first network elements share a second network element, both of said first network elements include respectively an active file handling device and a standby file handling device. In this method, said active file handling device copies the files to the second network element, if said standby file handling device finds that said active file handling device misses the files, said standby file handling device copies backups of the files to said active file handling device, thus the files stored in said active file handling device and the files stored in said standby file handling device being synchronized.

BRIEF DESCRIPTION OF THE DRAWINGS

These and many other features and advantages of the present invention will become apparent from the following description of the embodiments of the present invention with reference to the drawings, wherein.

DETAILED DESCRIPTION OF THE INVENTION

The present invention proposes a method for doubly backing up files asynchronously. This method is based on the idea illustrated in FIG. 2.

Figure 1:
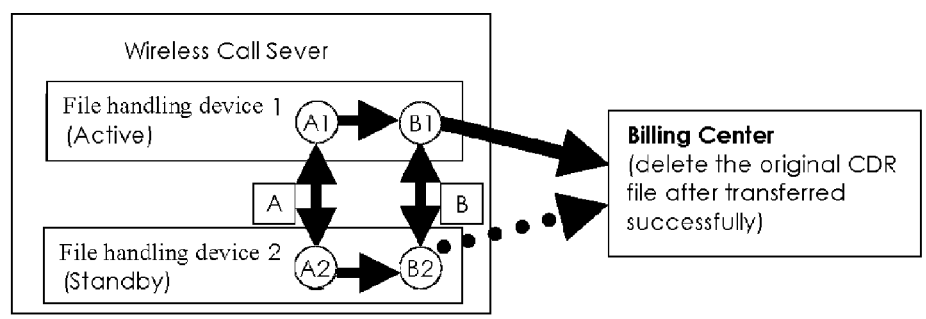
FIG. 1 shows an existing solution for synchronous double backup with active/standby mechanism.
Figure 2:
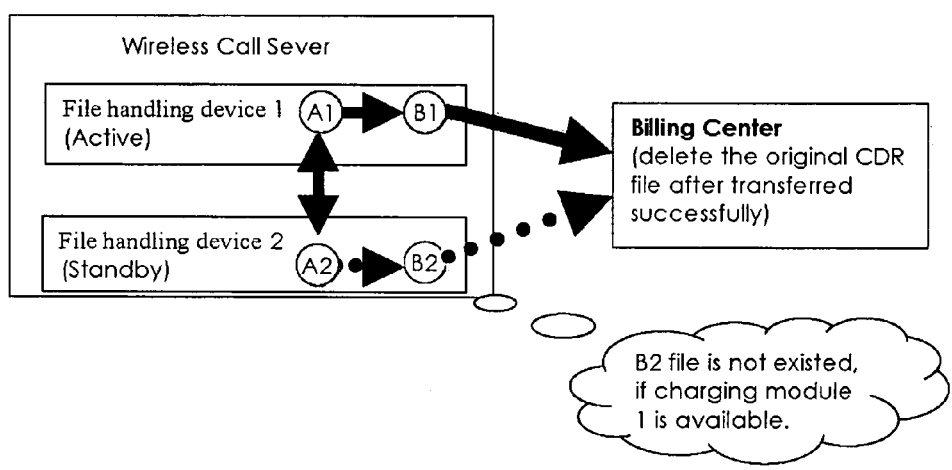
FIG. 2 illustrates the basic idea of the present invention.

As show in FIG. 2, for example, said files are CDR files, the active and standby file handling devices are in one network element such as WCS, and the file handling device 1 is in active status. For synchronization between A1 and A2, if the standby file handling device 2 finds that the active file handling device 1 misses file(s), then it will copy backup file(s) to the active file handling device 1 so as to ensure file sets A1 and A2 are synchronized. In fact, in our solution, there exists no synchronization between file sets B1 and B2. That is to say, if the file handling device 1 is active, then the CDR files are transferred to B1 file set. Otherwise the CDR files are transferred to B2 file set. The active file handling device 1 copies the CDR file from file set A1 to B1. In addition, there exists no file transfer from A2 to B2, except that the file handling device 1 is unavailable.

After remove the synchronization between B1&B2, above solution consumes less system resource compare with existing solution.

For further optimizing the method of the present invention, i.e. to save hardware cost, we introduce a network element such as post process modules (PPM) to handle part of the "asynchronous double backup solution" task separately by connecting multiple WCS. The PPM is used for collecting, processing, transferring files, and for storing files in respective directories for difference WCSs. Furthermore, the PPM could also perform a CDR post processing when needed, which is done usually by the billing center. Comparing with the hardware cost save, the system architecture becomes a little complex, but which is acceptable.

Figure 3:
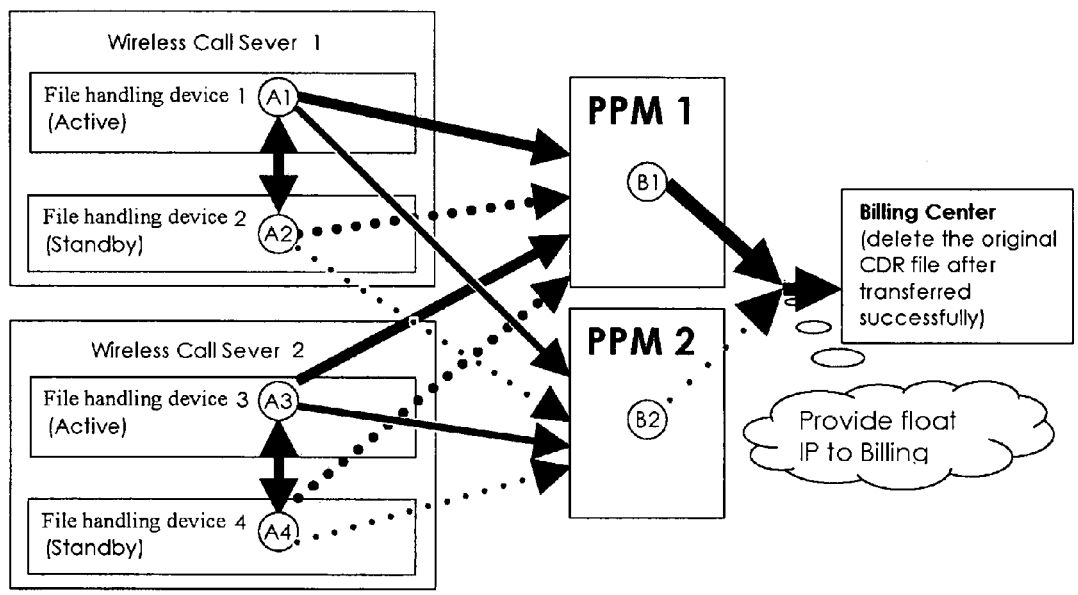
FIG. 3 illustrates the method for doubly backing up files asynchronously according to an embodiment of the present invention.

With reference to FIG. 3, for example two WCSs are connected to the PPM 1 which is in active state, or to the standby PPM 2 when the PPM 1 fails, but the present invention is not limited to this, i.e. there may be multiple WCSs connected to the two PPMs. Assume that the file handling device 1 and PPM 1 are in active status. Note that if PPM 1 is available, then the thick active/standby path is followed; if PPM 1 is unavailable, then the fine active/standby path is followed. It can be seen from this figure that, only one synchronization mechanism is used. For synchronization between A1 and A2 and between A3 and A4, if the standby file handling devices 2 and 4 find that the active file handling devices 1 and 3 miss files, then they will copy backup files to the active file handling devices 1 and 3 so as to ensure that the file sets A1 and A2 as well as the file sets A3 and A4 are synchronized. As shown, the active PPM 1 contains file set B1 and the standby PPM 2 contains file set B2, and there exists no synchronization between B1 and B2. Since the file handling device 1 is active, the CDR files are transferred to B1 file set. Otherwise CDR files are transferred to B2 file set. The active file handling device 1 of WCS1 copies the CDR file(s) from file set A1 to B1. The active file handling device 3 of WCS2 copies the CDR file(s) from file set A3 to B1. The standby file handling devices 2 and 4 won't copy CDR file(s) from WCSs 1 and 2 to the PPM.

It should be noted that, currently, the WCS can configure the PPM 1 and PPM 2 with respective IP addresses, and the IP address of PPM 1 has a higher priority than that of PPM 2. Therefore, the WCS can output CDR files to the PPM 1 or PPM 2 according to its priority of IP address and available status automatically. Both of the PPMs may provide a float IP address to the billing center. This means that the PPM 1 and PPM 2 are the same IP from the billing center's point of view.

Figure 4:
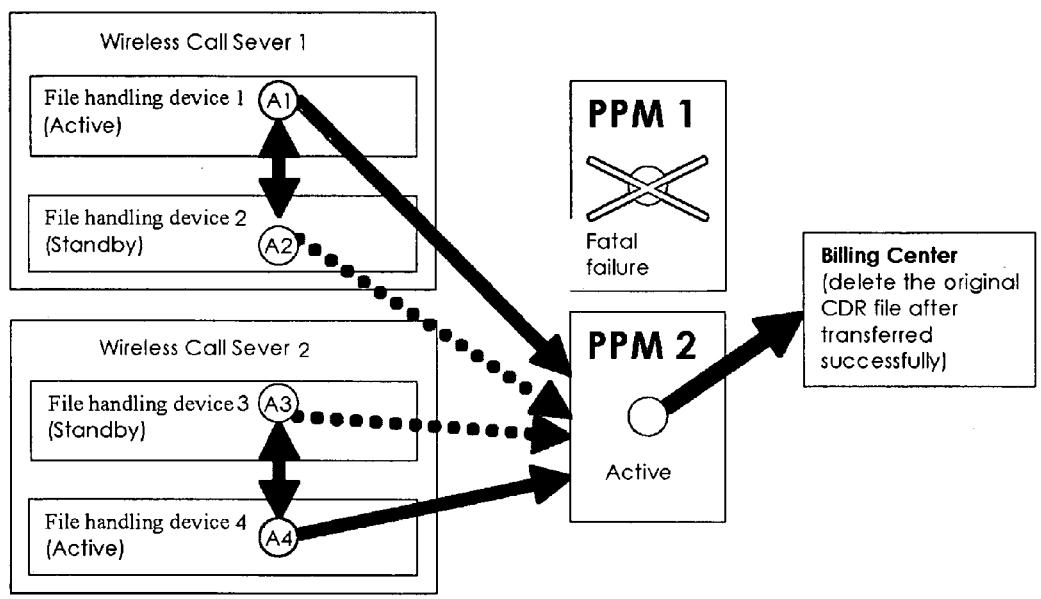
FIG. 4 illustrates another possible case of the method of the present invention of FIG. 3.

FIG. 4 illustrates another possible case of the method of the present invention of FIG. 3. As shown in FIG. 4, the file handling devices 1 and 4 are active, and the PPM 1 fails. In this case, if the standby file handling devices 2 and 3 find that the active file handling devices 1 and 4 miss files, then they will copy backup files to the active file handling devices 1 and 4 so as to ensure that those file sets are synchronized. The active file handling devices 1 and 4 copy the CDR files from the WCSs 1 and 2 to the PPM 2. The standby file handling devices 2 and 3 won't copy the CDR files from WCSs 1 and 2 to the PPM 2.

Thereby, with this method, a very high-level data safety with one pair of hardware equipments and a durable interface can be provided, which interface refers to the interface between the WCS and the billing center. In addition, the system architecture is not too complex and the system resource usage is not too much. It can be seen that, the use of PPM may reduce cost remarkably.

According to the lab test result, reducing one pair of CDR file synchronization mechanisms may save 20% system resource (CPU, memory, etc) while doing synchronization task for WCS with 1M subscribers capacity. Furthermore, a single PPM can handle 10M mobile phone subscribers. If we calculate with the average 500K WCS capacity, then 95% hardware cost could be saved. If we calculate with the average 1M WCS capacity, then 90% hardware cost could be saved.

Below is compare result between the existing solution and this invention solution from different point of view:

|  | existing solution | invention solution without PPM | invention solution with PPM |
| --- | --- | --- | --- |
| data safety | very good | good | good |
| interface durable | good | good | good |
| system architecture | complex | simple | medium |
| system resource usage | high | low | low |
| cost | low | high | medium |

Although the exemplary embodiments of the method for doubly backing up files asynchronously of the present invention is described above in detail, the above embodiments are not exhaustive, and those skilled in the art can make numerous changes and modifications within the spirit and scope of the present invention. Therefore, the present invention is not limited to those embodiments, the scope of which is defined only by the appended claims.

The invention claimed is:

1. An apparatus, comprising:
   an active file handling device comprising an at least first file and an at least second file, said active file handling device being configured to copy said at least second file to a network element; and
   a standby file handling device comprising an at least first backup file associated with said at least first file in said active file handling device and an at least second backup file associated with said at least second file in said active file handling device, said standby file handling device being configured to copy said at least first backup file to said at least first file in said active file handling device when said standby file handling device finds that said active file handling device misses said at least first file, wherein said standby file handling device is not configured to synchronize said at least second backup file with said at least second file in said active file handling device when said standby file handling device finds that said active file handling device misses said at least second file, and wherein said standby file handling device is not configured to transfer said at least first backup file to said at least second backup file.

2. The apparatus according to claim 1, wherein said at least first file and said at least second file comprise a call detail record.

3. The apparatus according to claim 1, wherein said active file handling device and said standby file handling device are configured to process, store and transfer said at least first file, said at least second file, said at least first backup and said at least second backup.

4. The apparatus according to claim 1, wherein said at least first file is a backup of said at least second file, and wherein said at least first backup file is a backup of said at least second backup file.

5. A system comprising at least two first network elements that share an active second network element and a standby second network element, wherein said active second network element comprises an at least second file associated with an at least second backup file in said standby second network element, and wherein said at least two first network elements comprise:
   an active file handling device comprising an at least first file, said active file handling device being configured to copy said at least first file to said active second network element; and
   a standby file handling device comprising an at least first backup file associated with said at least first file in said active file handling device, said standby file handling device being configured to copy said at least first backup file to said at least first file of said active file handling device when said standby file handling device finds that said active file handling device misses said at least first file, wherein said standby file handling device is not configured to copy said at least first backup file to said active second network element and said standby second network element; and wherein said standby second network element is not configured to synchronize said at least second backup file with said at least second file in said active second network element when said standby second network element finds that said active second network element misses said at least second file.

6. The system according to claim 5, wherein said active second network element is configured to delete said at least first file after said at least first file is transferred to a billing center.

7. The system according to claim 5, wherein said at least two first network elements comprise a wireless call server.

8. The system according to claim 5, wherein said active second network element is a post process module.

9. The system according to claim 5, wherein said active second network element is used to collect, process, and transfer said at least first file, and to store said at least first file in respective directories for each of said at least two first network elements.

10. The system according to claim 5, wherein said active file handling device is configured to copy said at least first file to said standby second network element when said active second network element fails.

11. The system according to claim 5, wherein said at least two first network elements are adapted to configure said active second network element and said standby second network element with respective IP addresses, and wherein an IP address of said active second network element has a higher priority than that of said standby second network element.

12. The system according to claim 5, wherein said at least two first network elements are configured to transfer said at least first file to said active second network element or said standby second network element according to a priority of an IP address and an available status automatically.

13. The system according to claim 5, wherein said active second network element and said standby second network element are configured to provide a float IP address to a billing center.

* * * * *